United States Patent
Vayssettes

(10) Patent No.: US 11,809,788 B2
(45) Date of Patent: Nov. 7, 2023

(54) METHOD FOR SIMULATING THE PHYSICAL BEHAVIOR OF A TIRE AND APPLICATION TO REAL-TIME SIMULATION

(71) Applicant: COMPAGNIE GENERALE DES ETABLISSEMENTS MICHELIN, Clermont-Ferrand (FR)

(72) Inventor: Jeremy Vayssettes, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 251 days.

(21) Appl. No.: 17/052,670

(22) PCT Filed: May 3, 2019

(86) PCT No.: PCT/FR2019/051022
§ 371 (c)(1),
(2) Date: Nov. 3, 2020

(87) PCT Pub. No.: WO2019/211570
PCT Pub. Date: Nov. 7, 2019

(65) Prior Publication Data
US 2021/0240879 A1 Aug. 5, 2021

(30) Foreign Application Priority Data
May 3, 2018 (FR) ........................................ 1853840

(51) Int. Cl.
*G06F 30/15* (2020.01)
*G06F 30/23* (2020.01)
(Continued)

(52) U.S. Cl.
CPC .............. *G06F 30/15* (2020.01); *G06F 30/23* (2020.01); *G06F 2111/10* (2020.01); *G06F 2119/14* (2020.01)

(58) Field of Classification Search
CPC ...... G06F 30/15; G06F 30/23; G06F 2119/14; G06F 2111/10
See application file for complete search history.

(56) References Cited

U.S. PATENT DOCUMENTS 5,930,155 A * 7/1999 Tohi ....................... B60C 99/006
                                                                  73/146
6,741,957 B1 * 5/2004 Sui ........................ B60C 99/006
                                                                  73/146
(Continued)

FOREIGN PATENT DOCUMENTS

FR          2905496 A1     3/2008

OTHER PUBLICATIONS

F. Bai, K. Guo, and D. Lu, "Tire Model for Turn Slip Properties" pp. 353-361, 2013 (Year: 2013).*
(Continued)

*Primary Examiner* — Kibrom K Gebresilassie
(74) *Attorney, Agent, or Firm* — VENABLE LLP

(57) ABSTRACT

A method for simulating the physical behavior of a tire comprises, to calculate a resultant force transmitted by the tire between the ground and the vehicle at a given instant: modelling (Ea) of the contact area in the form of a square surface, discretization (Eb) by a subdivision in slices orthogonal to the direction of travel of the tire, determination (Ec) of the nature of the contact, gripping or sliding, as a function of the steering lock angle, calculation (Ed) of the elementary force exerted on the slice by application of
(Continued)

predetermined equations, tire, and calculation (Ee) of the resultant force by integration of the elementary forces over the entire square surface.

14 Claims, 4 Drawing Sheets

(51) Int. Cl.
  *G06F 119/14* (2020.01)
  *G06F 111/10* (2020.01)

(56) References Cited

U.S. PATENT DOCUMENTS

| | | | |
|---|---|---|---|
| 7,912,683 B2 * | 3/2011 | Miyashita | G01M 17/022 152/209.15 |
| 8,560,289 B2 | 10/2013 | Fevrier et al. | |
| 2007/0074565 A1 * | 4/2007 | Jayakumar | G06F 30/23 73/146 |
| 2009/0292515 A1 | 11/2009 | Fevrier et al. | |
| 2019/0118582 A1 * | 4/2019 | Mansuy | B60C 11/0304 |

OTHER PUBLICATIONS

International Search Report dated Aug. 8, 2019, in corresponding PCT/FR2019/051022 (4 pages).
F. Bai, et al., "Tire Model for Turn Slip Properties," Sae Int. J. Commer. Veh., vol. 6, No. 2, pp. 353-361 (2013); XP055525093.
P. Jagt, "The Road to Virtual Vehicle Prototyping: New CAE-Models for Accelerating Vehicle Dynamics Development," Eindhoven: Technische Universiteit Eindhoven (2000); XP055524980.
J. Svendenius, et al., "Review of Wheel Modeling and Friction Estimation," Lund, pp. 3-38 (2003); XP055525467.

* cited by examiner

METHOD FOR SIMULATING THE PHYSICAL BEHAVIOR OF A TIRE AND APPLICATION TO REAL-TIME SIMULATION

1. FIELD OF THE INVENTION

The invention relates, broadly, to the techniques linked to the equipping of motor vehicles with tyres. It relates more particularly to a method for simulating the physical behaviour of a tyre equipping a vehicle that is stationary or virtually stationary on the ground with which the tread of the tyre has a contact area including a gripping contact zone and a sliding contact zone, the vehicle having a steering lock angle likely to vary during the simulation. The invention relates also to the application of the method of the invention to the real-time simulation of the dynamic behaviour of a vehicle provided with at least one tyre.

2. PRIOR ART

The invention falls within the scope of a refinement of the TameTire software (registered trademark of the company Michelin) that implements a method for simulating the physical behaviour of a tyre equipping a vehicle rolling on the ground. The method is described in detail in the patent document FR 2 905 496. In particular, the method makes it possible to calculate in real time the longitudinal forces, the transverse forces and a self-alignment torque of the tyre. The self-alignment torque is the torque exerted on the tyre at the interface with the ground, about an axis Z passing through the centre of the contact area, orthogonal to the surface of the ground and pointing upwards. The TameTire software did not initially offer a reliable simulation of the physical behaviour of the tyre in a stationary or virtually stationary steering lock situation, or in a transitional phase between the vehicle being stationary and rolling.

The existing models for simulating the behaviour of the tyre in a stationary or virtually stationary steering lock situation do not make it possible to take account of the physical parameters that are characteristic of the tyre, in particular of the estimation of the lengths and widths of contact areas, of the shear stiffness of the tread, on the grooving rate in the tread or the stiffness of the tyre.

3. OBJECTIVES OF THE INVENTION

The invention proposes a solution that aims to mitigate the abovementioned drawbacks. In particular, one objective of the invention is to propose a simulation of the behaviour of the tyre in a stationary or virtually stationary steering lock situation and in a situation of transition to rolling which takes account of the physical parameters characteristic of the tyre and which is compatible with a real-time application.

4. SUMMARY OF THE INVENTION

The invention relates to a method for simulating the physical behaviour of a tyre equipping a vehicle that is stationary or virtually stationary on the ground with which the tread of the tyre has a contact area including a gripping contact zone and a sliding contact zone, the method being implemented by a computer, the vehicle having a steering lock angle that varies during the simulation, this method being characterized in that it comprises the following steps to calculate a resultant force transmitted by the tyre between the ground and the vehicle at a given instant:

- modelling of the contact area in the form of a square surface,
- discretization of the square surface by a subdivision into slices orthogonal to the direction of travel of the tyre,
- for each slice, determination of the nature of the contact, gripping or sliding, between the slice and the ground as a function of the steering lock angle,
- for each slice, calculation of the elementary force exerted on the slice by application of predetermined equations, specific according to the nature of the contact, gripping or sliding, and expressed as a function of dynamic parameters linked to the conditions of use of the tyre and as a function of physical parameters characteristic of the tyre,
- calculation of the resultant force by integration of the elementary forces over the entire square surface.

A stationary or virtually stationary vehicle is understood to be a vehicle that has a speed below a speed threshold, for example 0.1 m/s. Such a method offers an aid to the design of the tyres inasmuch as it allows for a fine modelling of the forces transmitted by the tyre between the ground and the vehicle in the context of manoeuvres when stationary or virtually stationary, for example in a manoeuvre aiming to park the vehicle. The modelling of the forces transmitted by the tyre between the ground and the vehicle also makes it possible to deduce therefrom the forces transmitted to the steering wheel in a manoeuvre. Thus, when the method is coupled with a modelling of the vehicle, for example in a driving simulator, it can constitute an aid to the design of the steering systems. The method allows for a particularly fine modelling of the forces because it finely models the tyre by taking account of the physical parameters that are characteristic of the tyre. In practice, the method of the invention makes it possible to link the design parameters of a tyre with a resultant datum without needing to measure the tyre on a test machine. It also makes it possible to easily vary the design parameters in order to see the effects directly on the result of the simulation.

According to a particular embodiment of the invention, the contact area having a substantially rectangular form of length L and of width l, the square surface modelling the contact area has sides of dimension $(L+l)/2$ corresponding to the average of the length L and of the width l. Such a modelling of the contact area makes it possible to obtain results that are more representative of reality, in particular to faithfully represent an alignment torque, despite a discretization of the contact area in a single direction, in slices orthogonal to the direction of travel of the tyre. A discretization of the contact area in a single direction makes it possible, compared to a discretization in two mutually orthogonal directions, to reduce the computation time but proves unsatisfactory in the absence of modelling in the form of a square surface in the case of large tyres, hence the proposed step of transition to a contact area of square form.

According to a particular embodiment of the invention, the calculated resultant force models a self-alignment torque. The modelling of the self-alignment torque makes it possible to determine forces deriving from the ground on the tyre and that can be transmitted to the steering wheel through the steering of the vehicle. Thus, that can make it possible to better define the force and torque stresses that assisted steering has to withstand.

According to a particular embodiment of the invention, the steering lock angle considered is the steering lock angle relative to an initial steering lock angle corresponding:
- to the slip angle if there has been slip of the tyre when stationary; or to the steering lock angle applied at the last instant of non-zero speed otherwise. The consideration of a steering lock angle relative to an initial steering lock angle makes it possible to take account of the hysteresis phenomena involved in a steering lock when stationary or virtually stationary.

According to a particular embodiment of the invention, the determination of the nature of the contact, gripping or sliding, between the slice and the ground is performed as a function of the absolute value of the steering lock angle and of its direction of variation. This is a simple and reliable way of determining the nature of the contact.

According to a particular embodiment of the invention, the determination of the nature of the contact, gripping or sliding, between the slice and the ground comprises the comparison of the absolute value of the steering lock angle to a threshold value calculated specifically for each slice.

According to a particular embodiment of the invention, the determination of the nature of the contact, gripping or sliding, between the slice and the ground determines that:
  the contact is gripping:
    if the absolute value of the steering lock angle is less than the threshold value, or
    if the absolute value of the steering lock angle is greater than the threshold value and the direction of variation of the steering lock angle is reversed;
  the contact is slipping:
    if the absolute value of the steering lock angle is greater than the threshold value and the direction of variation of the steering lock angle is retained.

According to a particular embodiment of the invention, the threshold value calculated specifically for each slice is:
  proportional:
    to the coefficient of adhesion between the rubber of the tyre and the ground,
    to the local contact pressure,
    to the thickness of the tread;
  and inversely proportional:
    to the shear modulus of the tread,
    to the softening coefficient of the tread,
    to the grooving rate of the tread,
    to the distance of the slice relative to a central slice.

According to a particular embodiment of the invention, for a gripping contact, the elementary forces calculated for the modelling of the self-alignment torque are:
  proportional:
    to the shear modulus of the tread,
    to the softening coefficient of the tread,
    to the grooving rate of the tread,
    to the square of the distance of the slice relative to a central slice,
    to the width of the contact area,
    to the steering lock angle,
    to the width of the slice;
  and inversely proportional:
    to the thickness of the tread.

According to a particular embodiment of the invention, for a sliding contact, the elementary forces calculated for the modelling of the self-alignment torque are:
  proportional:
    to the coefficient of adhesion between the rubber of the tyre and the ground,
    to the local contact pressure,
    to the distance of the slice relative to a central slice,
    to the width of the contact area,
    to the width of the slice.

According to a particular embodiment of the invention, in a transitional phase between the vehicle being stationary and rolling, the resultant force is calculated from the sum:
  of a first term corresponding to a resultant force calculated in an assumption of the vehicle being stationary, the first term being weighted by a first coefficient that is variable between 0 and 1 and that decreases exponentially with the distance travelled from stationary, and
  of a second term corresponding to a resultant force calculated in an assumption of the vehicle rolling, the second term being weighted by a second coefficient that is variable between 0 and 1 and that increases exponentially with the distance travelled from stationary;
  the sum of the first coefficient and of the second coefficient being equal to 1. Such a calculation makes it possible to take account of the relaxation of the forces with rolling.

According to a particular embodiment of the invention, in a transitional phase between the vehicle being stationary and rolling, the resultant force is calculated from a coefficient of adhesion obtained by the sum:
  of a first term corresponding to a coefficient of adhesion in an assumption of the vehicle being stationary, the first term being weighted by a first coefficient that is variable between 0 and 1 and that decreases exponentially with the distance travelled from stationary;
  of a second term corresponding to a coefficient of adhesion in an assumption of the vehicle rolling, the second term being weighted by a second coefficient that is variable between 0 and 1 and that increases exponentially with the distance travelled from stationary;
  the sum of the first coefficient and of the second coefficient being equal to 1. Such a calculation makes it possible to take account of the modification of the coefficient of adhesion with rolling.

The invention relates also to the application of the method of the invention to the real-time simulation of the dynamic behaviour of a vehicle provided with at least one tyre. The real-time simulation makes it possible to integrate the method with a driving simulator. Furthermore, the dynamic parameters deriving from the driving simulator reflect the reality more faithfully than a simple mathematical model. The simulation obtained is therefore particularly fine.

5. BRIEF DESCRIPTION OF FIGURES

Other inventive features and advantages will emerge from the following description, given in an indicative and non-limiting manner, with reference to the attached drawings, in which:

FIG. 2b represents a square surface modelling the contact area of FIG. 2a;

6. DETAILED DESCRIPTION

Figure 1:
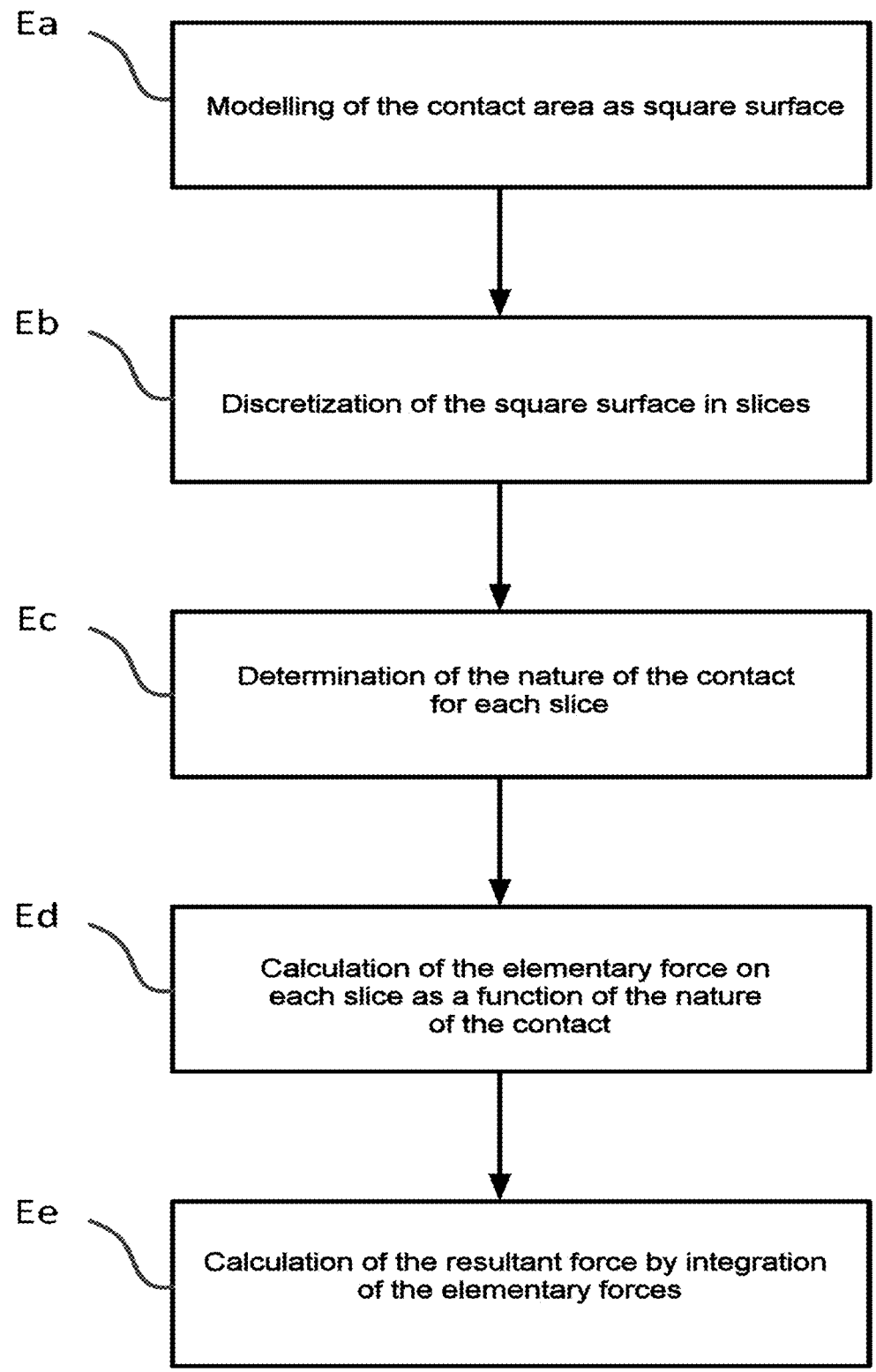
FIG. 1 represents a flow diagram of a method according to an embodiment of the invention.

FIG. 1 represents a flow diagram of a method according to an embodiment of the invention.

The method comprises:
- a first step Ea of modelling of the contact area in the form of a square surface;
- a second step Eb of discretization of the square surface by a subdivision into slices orthogonal to the direction of travel of the tyre;
- a third step in which, for each slice, there is a determination Ec of the nature of the contact, gripping or sliding, between the slice and the ground as a function of the steering lock angle;
- a fourth step in which, for each slice, there is a calculation Ed of the elementary force exerted on the slice by the application of predetermined equations, specific according to the nature of the contact, gripping or sliding, and expressed as a function of dynamic parameters linked to the conditions of use of the tyre and as a function of physical parameters characteristic of the tyre; and
- a fifth step Ee of calculation of the resultant force by integration of the elementary forces over the entire square surface.

Hereinbelow, the modelling method will be detailed in an exemplary case in which the resultant force calculated models a self-alignment torque Mz.

Figure 2A:
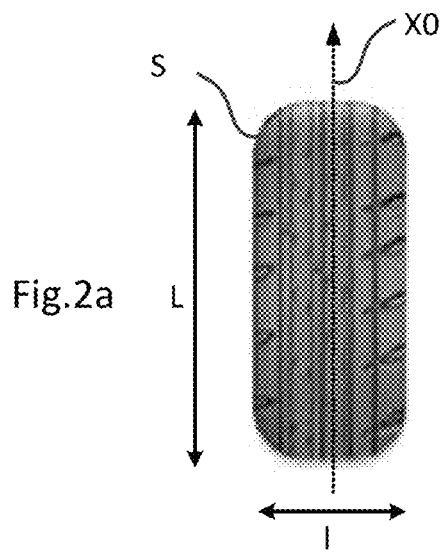
FIG. 2a represents a schematic view of a contact area of a tyre.
Figure 2B:
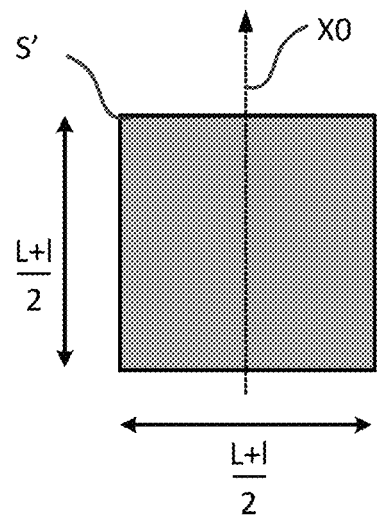

FIGS. 2a and 2b show the first step Ea of modelling of the contact area in the form of a square surface. FIG. 2a represents a contact area S having a substantially rectangular form of length L and of width l. The length L of the contact area S is aligned with the direction of travel of the tyre represented by the axis X0. According to a particular embodiment of the first step, the contact area S is modelled by a square surface S' represented in FIG. 2b and having sides of dimension (L+l)/2 corresponding to the average of the length L and of the width l of the contact area S. The square surface S' comprises two sides aligned with the length of the contact area S and two sides aligned with the width of the contact area S. This modelling is equivalent, from a point of view of the self-alignment torque when stationary or virtually stationary, to the real contact area.

Figure 3:
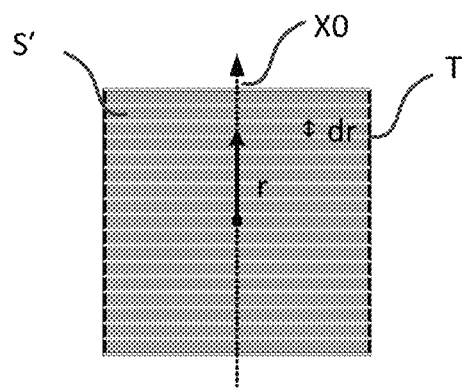
FIG. 3 represents a discretization of the square surface of FIG. 2b by a subdivision to slices.

FIG. 3 represents a discretization Eb of the square surface S' of FIG. 2b by a subdivision into slices T in accordance with the second step of the method of the invention. The slices T obtained are rectangular. They have a length of dimension (L+l)/2 orthogonally to the direction of travel and a width dr according to the direction of travel. Each slice T is registered by the abscissa r of its centre on the axis X0, the zero abscissa being fixed at the centre of the square surface S'. The zero abscissa of point corresponds to the pivot point of the tyre in a steering lock when stationary.

Optionally, an additional discretization of the square surface orthogonally to the discretization in slices described above could be performed in order to refine the results of the modelling. However, this option creates an increase in computation time in the implementation of the method, while the modelling in the form of a square area already makes it possible to obtain highly satisfactory results.

The third step of the method is detailed hereinbelow. This step comprises, for each slice, a determination Ec of the nature of the contact, gripping or sliding, between the slice T and the ground as a function of the steering lock angle.

Figure 4:
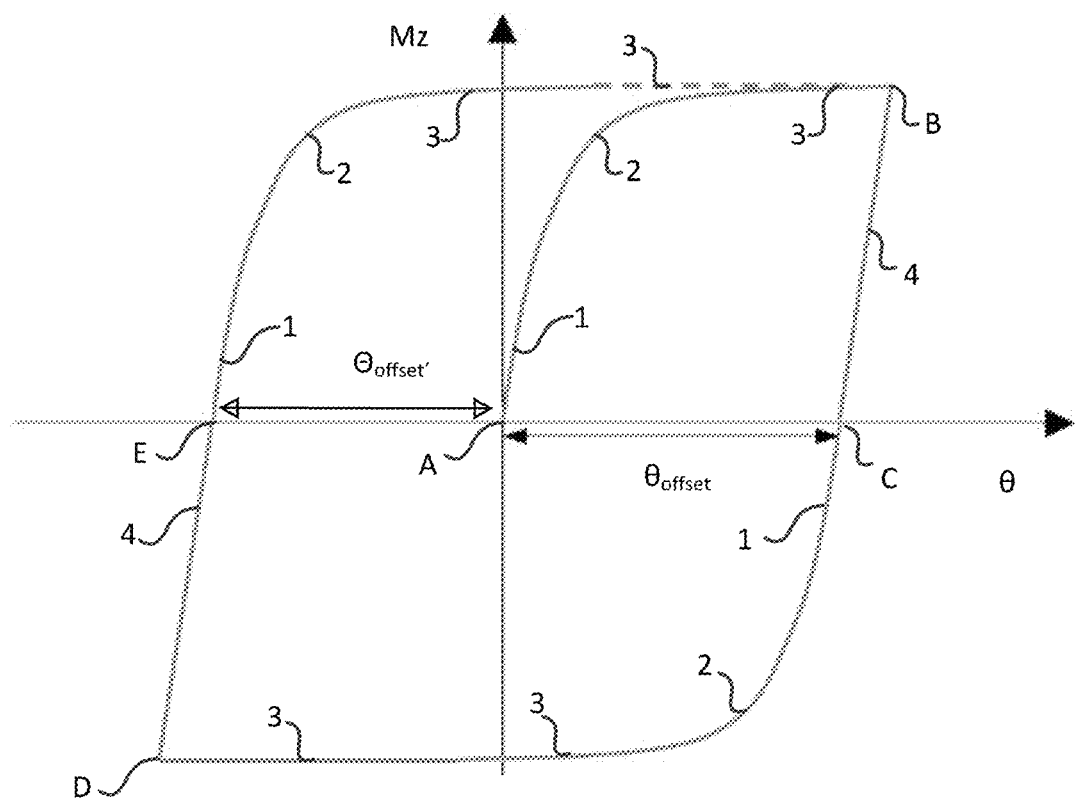
FIG. 4 is a graph representing the value of the self-alignment torque (Mz) as a function of the value of the real steering lock angle.

FIG. 4 is a graph representing the value of the self-alignment torque Mz as a function of the value of the real steering lock angle $\Theta$ in a steering lock cycle. The real steering lock angle corresponds to the angle between the orientation of the wheel and the axis of the vehicle. By convention, the real steering lock angle increases when the driver steers to the right and decreases when the driver steers to the left; the self-alignment torque is positive when it is exerted in the clockwise direction relative to an axis Z passing through the centre of the contact area, orthogonal to the surface of the ground and pointing upwards, and the self-alignment torque is negative when it is exerted in the counter clockwise direction relative to the axis Z. It will be noted that that corresponds to a non-direct reference frame system (positive angle upon a rotation in the clockwise direction).

The person skilled in the art will be able to modify the various parameters for a counter clockwise rotation.

In the initial situation represented by the point A, the self-alignment torque has a zero value for a zero real steering lock angle. From the point A, the driver steers to the right and the absolute value of the self-alignment torque increases with the real steering lock angle. Then, from the point B, the driver counter-steers to the left and the steering lock angle decreases, which leads to a drop in the absolute value of the self-alignment torque. The cycle represented highlights a phenomenon of hysteresis inasmuch as the self-alignment torque is once again cancelled at a point C distinct from the point A. At the point C, the steering lock angle has a value $\Theta_{offset}$ that is positive. Between the point A and the point C, the self-alignment torque has positive values.

From the point C, the driver continues to steer to the left. As the driver continues to steer to the left, the real steering lock angle decreases to be cancelled and then take negative values. Simultaneously with the steering to the left, the absolute value of the self-alignment torque increases but the self-alignment torque this time has negative values. Then, from the point D, the driver counter-steers to the right and the steering lock angle once again increases, which leads to a drop in the absolute value of the self-alignment torque. The self-alignment torque is once again cancelled at a point E distinct from the points A and C. At the point E, the steering lock angle has a value $\Theta$offset' that is negative. Between the point C and the point E, the self-alignment torque has negative values.

From the point E, the driver continues to steer to the right. As the driver continues to steer to the right, the real steering lock angle increases to be cancelled then take positive values. Simultaneously with the steering to the right, the absolute value of the self-alignment torque increases and the self-alignment torque this time has positive values. Then, from the point B, the driver counter-steers to the left and the steering lock angle once again decreases, which leads to a drop in the absolute value of the self-alignment torque. The self-alignment torque is once again cancelled at the point C. Between the point E and the point C, the self-alignment torque has positive values. This cycle can continue thus from the point C as described above.

Given the hysteresis, the steering lock angle $\Theta$ considered to study the curve is:
- $\Theta$real between the point A and the point C,
- ($\Theta$real-$\Theta$offset) between the point C and the point E; and
- ($\Theta$real-$\Theta$offset') between the point E and the point C.

Thus, the curve of the graph can be broken down into four types of phases.

In a first phase 1, called quasi-linear phase, the torque Mz increases proportionally to the steering lock angle Θ. The tyre is gripping with the ground over all the contact area, the rubber of the tread is sheared and the tyre is twisted.

In a second phase 2, called transitional phase, the increase in the torque Mz with the steering lock angle Θ is less great. An increasingly large portion of the tread slips, the maximum shearing of the rubber is reached. The tyre continues to be twisted.

In a third phase 3, called saturation phase, the torque Mz no longer increases practically with the steering lock angle Θ. The tyre saturates at the level of the shearing of the tread and consequently slips over almost all the contact area. Maximum twist is reached.

In a fourth phase 4, called de-shearing phase, the wheel is steered in the other direction, the torque Mz decreases strongly with the reduction of the angle Θ. The tyre straightens and the shearing drops almost linearly over all the contact area and is cancelled for a steering lock angle value, called angle of slide.

The graph of FIG. 4 thus makes it possible to determine the nature of the contact, gripping or sliding, between the slice T and the ground as a function of the steering lock angle Θ.

Figures 5A, 5B:
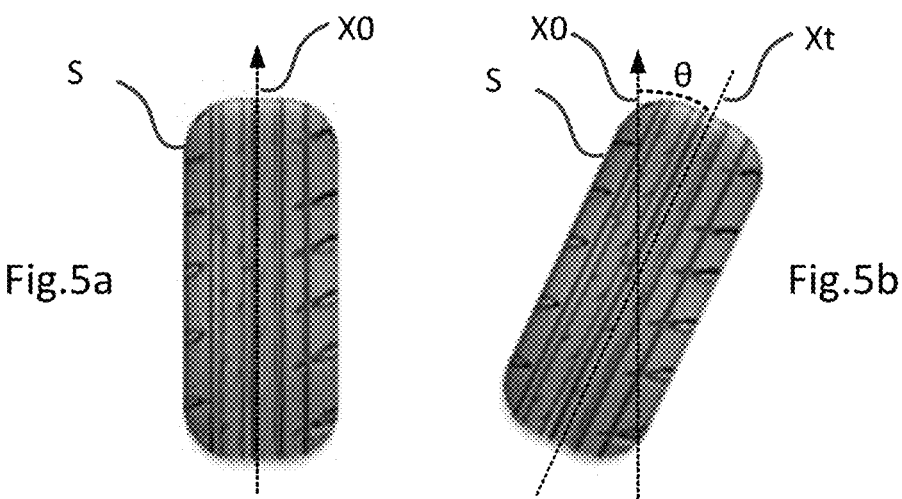
FIGS. 5a and 5b represent the contact area of FIG. 2a respectively in an initial state with an initial steering lock angle and in a steering lock state when stationary relative to the initial steering lock angle.

Firstly, the steering lock angle considered for the determination of the nature of the contact must take account of the phenomenon of hysteresis observed above, the phenomenon of hysteresis introducing an angle of slide. FIG. 5a represents the contact area of FIG. 2a in an initial state with an initial steering lock angle $\Theta_0$ applied at the last instant of zero self-alignment torque. When a steering lock has already taken place when stationary with slip, the initial steering lock angle $\Theta_0$ corresponds to the angle of slide described above. Otherwise, the initial steering lock angle $\Theta_0$ corresponds to the steering lock angle applied at the last instant of non-zero speed. FIG. 5b represents the contact area in a steering lock state when stationary relative to the initial steering lock angle. In the initial state, the direction of travel of the tyre is represented by the axis X0 and in the steering lock state, the direction of travel of the tyre is represented by the axis Xt. The angle formed between the axis X0 and the axis Xt is the steering lock angle Θ. Thus, the steering lock angle Θ considered is the steering lock angle relative to an initial steering lock angle $\Theta_0$ taking account of the relaxation of the tyre if there has been an initial rolling phase.

The steering lock angle considered in the calculations is therefore expressed as follows:

$$\theta = \theta_{real} - \theta_0$$

Secondly, the determination of the nature of the contact, gripping or sliding, between the slice and the ground is performed as a function of the absolute value of the steering lock angle Θ and of its direction of variation.

In particular, for each slice T $\theta_T = \theta_{T,preceding} d\theta_T$ as long as the threshold is not exceeded and $\theta_T = \theta_{max}$ otherwise. Therefore, when the threshold is exceeded, the $\theta_T$ considered at each slice n remains constant while the steering lock angle continues to increase. The offset linked to the sliding therefore results from this thresholding.

Note that the sliding is different for each "slice" of the tyre. The offset linked to the sliding is therefore different for each of the slices of the tyre. On the other hand, the offset linked to a non-zero steering lock angle after a rolling phase, or to the relaxation of the tyre, is global, that is to say that it is the same for all the slices.

Figure 6:
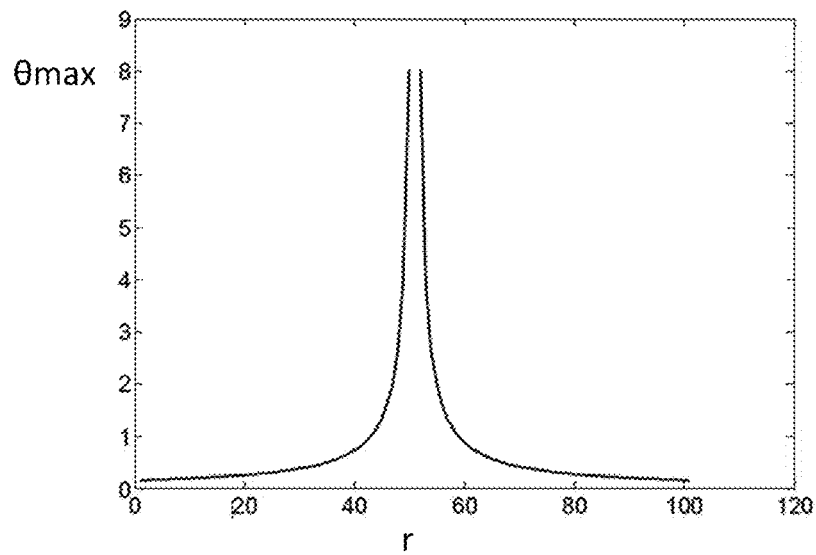
FIG. 6 is a graph representing the threshold value of the steering lock angle for a slice as a function of the abscissa of the slice.

FIG. 6 is a graph representing the threshold value Θmax of the steering lock angle for a slice as a function of the abscissa r of the slice. The graph shows that the central slices, that is to say of abscissa r close to 0, have a high threshold value Θmax; indeed, the threshold value Θmax tending towards +∞ when the abscissa r tends toward 0. Consequently, the central slices grip more. On the other hand, the peripheral slices, that is to say of abscissa r away from 0, have a low threshold value Θmax; indeed, the threshold value Θmax tending towards 0 when the abscissa tends towards +∞ or −∞. Consequently, the peripheral slices slide more.

The threshold value Θmax is given by the following equation:

$$\theta max = \frac{\mu \cdot P \cdot e_{KM}}{G* \cdot Ass \cdot ent \cdot abs(r)}$$

Thus, the threshold value Θmax is:
proportional:
to the coefficient of adhesion (μ) between the rubber of the tyre and the ground,
to the local contact pressure (P),
to the thickness of the tread ($e_{KM}$),
and inversely proportional:
to the shear modulus (G*) of the tread,
to the softening coefficient of the tread (Ass),
to the grooving rate of the tread (ent),
to the distance (abs(r)) of the slice relative to a central slice.

The direction of variation of Θ, that is to say the direction of the steering lock, is determined by the sign of the difference between the value of the steering lock angle Θ(t+1) at the instant t+1 and the value of the steering lock angle Θ(t) at the preceding instant t:

Variation Direction $\theta = \text{sign}(\theta(t+1) - \theta(t))$

The determination of the nature of the contact, gripping or sliding, between the slice and the ground, determines that:
the contact is gripping:
if the absolute value of the steering lock angle Θ is less than the threshold value Θmax, or
if the absolute value of the steering lock angle Θ is greater than the threshold value Θmax and the direction of variation of the steering lock angle is reversed;
the contact is slipping:
if the absolute value of the steering lock angle Θ is greater than the threshold value Θmax and the direction of variation of the steering lock angle is retained.

The fourth step is detailed hereinbelow. In this step, for each slice, there is the calculation Ed of the elementary force exerted on the slice by application of predetermined equations, specific according to the nature of the contact, gripping or sliding, and expressed as a function of dynamic parameters (for example the steering lock angle or the pressure of the tyre) linked to the conditions of use of the tyre and as a function of physical parameters (for example the estimation of the lengths and widths of contact areas, the shear stiffness of the tread, the grooving rate in the tread or the stiffness of the tyre) that are characteristic of the tyre.

For a gripping contact, the elementary forces calculated for the modelling of the self-alignment torque Mz are obtained by the following formula:

$$dMz = \frac{G* \cdot Ass \cdot ent \cdot r^2 \cdot \theta T \cdot L \cdot dr}{e_{KM}}$$

Thus, for a gripping contact, the elementary forces calculated for the modelling of the self-alignment torque Mz are:
proportional:
  to the shear modulus (G*) of the tread,
  to the softening coefficient of the tread (Ass),
  to the grooving rate of the tread (ent),
  to the square of the distance (abs(r)) of the slice relative to a central slice,
  to the width of the contact area ((L+l)/2),
  to the steering lock angle of the slice ($\theta_T$);
  to the width of the slice (dr);
and inversely proportional:
  to the thickness of the tread ($e_{KM}$).

For a sliding contact, the elementary forces calculated for the modelling of the self-alignment torque (Mz) are obtained by the following formula:

$dMz=\mu \cdot P \cdot L \cdot \text{abs}(r) \cdot \text{Variation Direction } \theta \cdot dr$ Thus, for a sliding contact, the elementary forces calculated for the modelling of the self-alignment torque (Mz) are:
proportional:
  to the coefficient of adhesion (μ) between the rubber of the tyre and the ground,
  to the local contact pressure (P),
  to the distance (abs(r)) of the slice relative to a central slice,
  to the width of the contact area ((L+l)/2),
  to the direction of variation of Θà
  to the width of the slice (dr).

In the fifth step Ee of calculation of the resultant force, the resultant force is calculated by integration of the elementary forces over the entire square surface. The integration formula is as follows:

$$Mz = \sum_{rmin}^{rmax} dMz$$

Also provided is the calculation of a resultant force in a transitional phase between the vehicle being stationary and rolling. By convention, the vehicle is considered to be stationary when its speed is below a speed threshold. In an illustrative and nonlimiting manner, the speed threshold is for example 0.1 m/s. In a transitional phase between the vehicle being stationary and rolling, the resultant force is calculated from the sum:
  of a first term $Mz_{stationary}$ corresponding to a resultant force calculated in an assumption of the vehicle being stationary, the first term being weighted by a first coefficient $e^{-D/D0}$ that is variable between 0 and 1 and that decreases exponentially with the distance D travelled from stationary, and
  of a second term $Mz_{rolling}$ corresponding to a resultant force calculated in an assumption of the vehicle rolling, the second term being weighted by a second coefficient $(1-e^{-D/D0})$ that is variable between 0 and 1 and that increases exponentially with the distance D travelled from stationary;
  the sum of the first coefficient and of the second coefficient being equal to 1.

For example, in the case of the calculation of the self-alignment torque Mz, the formula used is as follows:

$$Mz = Mz_{stationary} \cdot \left(e^{-\frac{D}{D0}}\right) + Mz_{rolling} \cdot \left(1 - e^{-\frac{D}{D0}}\right)$$

In which:
  D is the distance travelled from the last stop; and
  D0 is a predetermined coefficient, that is to say a numeric value set in advance.

Furthermore, to take account of the relaxation of the self-alignment torque in a transitional phase between the vehicle being stationary and rolling, the steering lock angle Θ used in the calculations is obtained by the formula:

$$\theta = (\theta real - \theta_0) e^{-\frac{D}{D0}'}$$

In which:
  D is the distance travelled from the last stop; and
  D0' is a predetermined coefficient, that is to say a numeric value set in advance.

In a way similar to what is done for the self-alignment torque, in a transitional phase between the vehicle being stationary and rolling, the coefficient of adhesion μ in a static situation (stationary) is different from the coefficient of adhesion at high slipping speed (rolling). To best represent this transition in the calculations, there is the sum:
  of a first term $\mu_{stationary}$ corresponding to a coefficient of adhesion in an assumption of the vehicle being stationary, the first term being weighted by a first coefficient $e^{-D/D0''}$ that is variable between 0 and 1 and that decreases exponentially with the distance D travelled from stationary,
  of a second term $\mu_{rolling}$ corresponding to a coefficient of adhesion in an assumption of the vehicle rolling, the second term being weighted by a second coefficient $(1-e^{-D/D0''})$ that is variable between 0 and 1 and that increases exponentially with the distance D travelled from stationary;
  the sum of the first coefficient and of the second coefficient being equal to 1.

For example, the formula used is as follows:

$$\mu = \mu_{stationary} \cdot \left(e^{-\frac{D}{D0''}}\right) + \mu_{rolling} \cdot \left(1 - e^{-\frac{D}{D0''}}\right)$$

In which:
  D is the distance travelled from the last stop; and
  D0" is a predetermined coefficient, that is to say a numeric value set in advance.

The invention is described in the above by way of example. It is understood that the person skilled in the art will be able to produce different variant embodiments of the invention, by associating, for example, the various features above taken alone or in combination, without in any way departing from the scope of the invention.

The invention claimed is:

1. A method for simulating a physical behavior of a tire equipping a vehicle, the method being implemented by a computer and comprising the following steps:
  measuring conditions of use of the tire, physical parameter characteristics of the tire, and a direction of travel of the tire;

modelling a contact area of a tread of the tire with a ground in a form of a square surface, wherein the contact area includes a gripping contact zone and a sliding contact zone;

discretizing the square surface by subdivision into slices orthogonal to the direction of travel of the tire;

for each of the slices, calculating a nature of a contact, gripping or sliding, between the slice and the ground as a function of a steering lock angle, wherein the vehicle is stationary or virtually stationary on the ground having the steering lock angle that varies during simulation;

for each of the slices, calculating an elementary force exerted on the slice by application of predetermined equations, specific according to the nature of the contact, gripping or sliding, and expressed as a function of dynamic parameters linked to the conditions of use of the tire and as a function of the physical parameter characteristics of the tire;

calculating a resultant force transmitted by the tire between the ground and the vehicle at a given instant by integration of the elementary forces over an entirety of the square surface to link design parameters of the tire with the resultant force; and simulating the physical behavior of the tire based on the calculating of the resultant force.

2. The method according to claim 1, wherein, the contact area having a substantially rectangular form of length L and of width l, the square surface modelling the contact area has sides of dimension (L+1)/2 corresponding to an average of the length L and of the width l.

3. The method according to claim 1, wherein the calculated resultant force models a self-alignment torque.

4. The method according to claim 1, wherein the steering lock angle is the steering lock angle relative to an initial steering lock angle corresponding to the steering lock angle applied at a last incident of non-zero speed.

5. The method according to claim 1, wherein determining the nature of the contact, gripping or sliding, between the slice and the ground, is performed as a function of an absolute value of the steering lock angle and of a direction of variation of the steering lock angle.

6. The method according to claim 5, wherein the determining the nature of the contact, gripping or sliding, between the slice and the ground, comprises comparison of the absolute value of the steering lock angle to a threshold value calculated specifically for each slice.

7. The method according to claim 6, wherein determining the nature of the contact, gripping or sliding, between the slice and the ground, determines that:

the contact is gripping if the absolute value of the steering lock angle is less than the threshold value, or if the absolute value of the steering lock angle is greater than the threshold value and the direction of variation of the steering lock angle is reversed; and the contact is sliding if the absolute value of the steering lock angle is greater than the threshold value and the direction of variation of the steering lock angle is retained.

8. The method according to claim 7, wherein the threshold value induces a slip of each of the slices for which the resultant force overall of the slices generates an offset linked to the slip creating a hysteresis effect.

9. The method according to claim 6, wherein the threshold value calculated specifically for each slice (T) is:

proportional to a grip coefficient between a rubber of the tire and the ground, to a local contact pressure, and to a thickness of the tread; and inversely proportional to a shear modulus of the tread, to a softening coefficient of the tread, to a grooving rate of the tread, and to a distance of the slice relative to a central slice.

10. The method according to claim 3, wherein, for a gripping contact, the elementary forces calculated for the modelling of the self-alignment torque are:

proportional to a shear modulus of the tread, to a softening coefficient of the tread, to a grooving rate of the tread, to a square of a distance from the slice relative to a central slice, to a width of the contact area ((L+1)/2), to the steering lock angle of the slice, and to a width of the slice; and inversely proportional to a thickness of the tread.

11. The method according to claim 3, wherein, for a sliding contact, the elementary forces calculated for the modelling of the self-alignment torque are:

proportional to a coefficient of adhesion between a rubber of the tire and the ground, to a local contact pressure, to a distance of the slice relative to a central slice, to a width of the contact area ((L+1)/2), and to a width of the slice.

12. The method according to claim 1, wherein, in a transitional phase between the vehicle being stationary and running, the resultant force is calculated from a sum:

of a first term corresponding to a resultant force calculated in an assumption of the vehicle being stationary, the first term being weighted by a first coefficient that is variable between 0 and 1 and that decreases exponentially with the distance travelled from being stationary; and of a second term corresponding to a resultant force calculated in an assumption of the vehicle rolling, the second term being weighted by a second coefficient that is variable between 0 and 1 and that increases exponentially with the distance travelled from being stationary, the sum of the first coefficient and of the second coefficient being equal to 1.

13. The method according to claim 1, wherein, in a transitional phase between the vehicle being stationary and rolling, the resultant force is a coefficient of adhesion obtained by a sum:

of a first term corresponding to a coefficient of adhesion $\mu_{stationary}$ in an assumption of the vehicle being stationary, the first term being weighted by a first coefficient that is variable between 0 and 1 and that decreases exponentially with the distance travelled from being stationary; and of a second term corresponding to a coefficient of adhesion $\mu_{rolling}$ in an assumption of the vehicle rolling, the second term being weighted by a second coefficient that is variable between 0 and 1 and that increases exponentially with the distance travelled from being stationary, the sum of the first coefficient and of the second coefficient being equal to 1.

14. A method of real-time simulating dynamic behavior of a vehicle provided with at least one tire comprising performing the method according to claim 1.

* * * * *